US007089540B2

(12) United States Patent
Ogasawara

(10) Patent No.: US 7,089,540 B2
(45) Date of Patent: Aug. 8, 2006

(54) COMPILING METHOD WITH EXCEPTION HANDLING

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 10/147,195

(22) Filed: May 15, 2002

(65) Prior Publication Data
US 2003/0217327 A1    Nov. 20, 2003

(51) Int. Cl.
G06F 9/45     (2006.01)
G06F 11/00    (2006.01)

(52) U.S. Cl. .............. 717/140; 717/151; 710/200; 714/796

(58) Field of Classification Search .............. 717/116, 717/118, 146, 148, 152, 153, 158, 151, 140; 712/200, 233; 710/108, 200; 719/313, 332; 714/1, 798
See application file for complete search history.

(56) References Cited

U.S. PATENT DOCUMENTS

| 5,881,280 | A  | * | 3/1999  | Gupta et al. ............... 712/244 |
| 5,901,308 | A  | * | 5/1999  | Cohn et al. ................ 712/244 |
| 5,968,157 | A  | * | 10/1999 | Joy et al. ................... 710/200 |
| 6,247,169 | B1 | * | 6/2001  | DeLong ..................... 717/131 |
| 6,247,172 | B1 | * | 6/2001  | Dunn et al. ................ 717/141 |
| 6,317,796 | B1 | * | 11/2001 | Bak et al. .................. 719/315 |
| 6,412,109 | B1 | * | 6/2002  | Ghosh ....................... 717/155 |
| 6,484,314 | B1 | * | 11/2002 | Ishizaki et al. ............. 717/151 |
| 6,530,079 | B1 | * | 3/2003  | Choi et al. ................. 717/158 |
| 6,634,023 | B1 | * | 10/2003 | Komatsu et al. ........... 717/151 |
| 6,757,891 | B1 | * | 6/2004  | Azagury et al. ............ 717/158 |
| 6,857,060 | B1 | * | 2/2005  | Elias et al. ................. 712/217 |
| 6,886,094 | B1 | * | 4/2005  | Blandy ...................... 712/244 |

OTHER PUBLICATIONS

David F. Bacon et al., Thin Locks: Featherweight Synchronization for Java, Jun. 1998, SIGPLAN Notices vol. 33, No. 6, pp. 1-11.*
David Bacon, "Featherweight Monitors with Bacon Bits", IBM T.J.Watson Research Center, 1997 (17 pages). [Online] [Retrieved at] <www.research.ibm.com/people/ d/dfb/talks/Bacon97FeatherweightTalk.pdf>.*

(Continued)

Primary Examiner—Tuan Dam
Assistant Examiner—Thuy Dao
(74) Attorney, Agent, or Firm—Jesse L. Abzug, Esq.; McGinn IP Law Group, PLLC

(57) ABSTRACT

When an execution program is to be compiled, based on information for the inlining of a function in this program, data concerning a lock set is generated for a lock for a resource due to the inlined function. Further, based on the lock data, the data concerning a lock count set upon the execution of code for the target program is added to this program. Then, when an exception has occurred during the execution of the program, the data concerning the lock count is employed to obtain the lock count at the time of execution of the code whereat the exception occurred, and the lock count set at the time of execution of an exception handler for this exception. After the locks for the resource have been released in a number equivalent to a difference between the two lock counts, the process for this exception is initiated.

18 Claims, 8 Drawing Sheets

OTHER PUBLICATIONS

Suganuma et al. "Overview of the IBM Java Just-in-Time Compiler", IBM Systems Journal, vol. 39, No. 1, 2000 (pp. 175-193). [Online] [Retrieved at] <citeseer.ist.psu.edu/context/1326616/0>.*

Ishizaki et al., "Design, Implementation, and Evaluation of Optimizations in a Just-In-Time Compiler", Java 1999 (pp. 119-128). [Online] [Retrieved at] <aspen.ucs.indiana.edu/CandCPandE/jg99papers>.*

Ogasawara et al. "A Study of Exception Handling and Its Dynamic Optimization in Java", 2001 (14 pages). [Online] [Retrieved at] <citeseer.ist.psu.edu/ogasawara01study/html>.*

* cited by examiner (A)

| | |
|---|---|
| A | try ID=NA   sync Info=[0] |
| S of A | try ID=1   sync Info=[0] |
| B | try ID=1   sync Info=[1]B |
| T of B | try ID=0   sync Info=[1]B |
| C | try ID=0   sync Info=[2]B,C |
| T of B | try ID=0   sync Info=[1]B |
| B | try ID=1   sync Info=[1]B |
| S of A | try ID=1   sync Info=[0] |
| A | try ID=NA   sync Info=[0] |
| C X exception | try ID=0   sync Info=[2]B,C | a1, a2, a3, a4, a5, a6

(B)

| addr range | #lock |
|---|---|
| a1—a2-1 | 1 |
| a2—a3-1 | 2 |
| a3—a4-1 | 1 |
| a5—a6-1 | 2 |

| A | S of A | B | T of B | C | T of B | B | S of A | A |
|---|---|---|---|---|---|---|---|---|
| try ID=NA | try ID=1 | try ID=1 | try ID=0 | try ID=0 | try ID=0 | try ID=1 | try ID=1 | try ID=NA |
| sync Info=[0] | sync Info=[0] | sync Info=[1]B | sync Info=[1]B | sync Info=[2]B,C | sync Info=[1]B | sync Info=[1]B | sync Info=[0] | sync Info=[0] |
| enc try ID=NA | enc try ID=1 | enc try ID=3 | enc try ID=2 | enc try ID=4 | enc try ID=2 | enc try ID=3 | enc try ID=1 | enc try ID=NA |

| A | S of A | B | T of B | C | T of B | B | S of A | A |
|---|--------|---|--------|---|--------|---|--------|---|

| try ID=NA | | | |
| try ID=1 | sync Info=[0] | enc try ID=NA | |
| try ID=1 | sync Info=[0] | enc try ID=1 | |
| try ID=0 | sync Info=[1]B | enc try ID=3 | |
| try ID=0 | sync Info=[1]B | enc try ID=2 | |
| try ID=0 | sync Info=[1]B | enc try ID=2 | |
| try ID=1 | sync Info=[1]B | enc try ID=2 | |
| try ID=1 | sync Info=[0] | enc try ID=3 | |
| try ID=NA | sync Info=[0] | enc try ID=1 | |
| | | enc try ID=NA | |

Fig. 7

COMPILING METHOD WITH EXCEPTION HANDLING

FIELD OF THE INVENTION

The present invention relates to a computer program optimization method, and in particular to an optimization method that is characterized by an exception handling method.

BACKGROUND

For several programming languages, an inlining method is employed as an optimization method. Inlining is a method whereby the description of a program is changed by embedding, in a calling source, the contents of the definition of a function, so that a process can be performed without function calls being required. As a result, since with this method no overhead is required for function calls, execution speed is increased.

In addition, for several programming languages a system is provided wherein, by declaring a specific area, an exception handler relevant to that area is used to process an exception occurring in that area during the execution of a program. In the Java™ programming language, which is one of the programming languages employing this system, this declaration is called a "try", and an area that is declared is called a try area or a try block. In the following explanation, in accordance with the Java™ programming languages, the declaration and the area are referred to as a try and a try area.

A programming language that enables the use of descriptions for multiple synchronous threads is essential when writing a system program for the construction of a complicated and reliable network including a sewer, or servers, and clients. An example programming language that satisfies this need is the Java™ programming language.

In the Java™ programming language, two critical sections called a synchronized method and a synchronized block can be described. Upon the occurrence of an exception, an execution system always unlocks these critical sections.

Further, the Java™ programming language is one of the programming languages that include a system forte implementation of the previously mentioned miming and try.

During the optimization process performed by a compiler (hereinafter referred to as a Java™ compiler) while compiling a program written in the Java™ programming language, when inlining is employed for a synchronized method, not only is it possible to acquire certain general effects, such as reduced costs accruing from the elimination of call functions, the transmission of constants and the transmission of class information, but also to remove redundant synchronization procedures.

However, to perform inlining, the number of resource locks, which is a use limit imposed in order to ensure exclusive resource use during a predetermined process, is increased and exceeds the number that is established by the language specifications. Therefore, an exception handling using a try is complicated for a program wherein inlining has been used for the synchronized method.

FIG. 8 is a diagram for explaining a conventional exception handling for a Java™ program wherein inlining is used for a synchronized method (hereinafter referred to simply as a method).

In the example in FIG. 8, for inlining, method A calls method B, and then method B calls method C. Method C is inlined in the try area for method B, and methods B and C lock an object at their entrances using the synchronized method.

In this example, assume that an exception E occurs in the inlined method C, and is caught by an exception handler in a try area T for the method B.

In this case, since the exception is processed outside the method C, the exception handler must unlock method C while maintaining the lock on method B. Therefore, the exception handler must be aware that the locks on methods B and C are set when an exception E is thrown, and the lock on method B is set when the exception handler for the try area T is executed. That is, data is required concerning the lock set upon the occurrence of an exception and the lock set upon the execution of the exception handler.

A Java™ compiler can include information (hereinafter referred to as inline information) for a correlation of a code area and an inlined method. The inline information indicates a called method to which the code originally belonged. Therefore, in the example in FIG. 8, while referring to the address whereat the exception is generated, the exception handler obtains the inline information "method A→method B→method C (this order shows that these methods are originally called; hereinafter, in the inline information "method" is eliminated)." Further referring to the address whereat the exception E is caught the inline information "A→B" is obtained. By comparing the inline information, the lock performed by method C is specified and released.

A conventional Java™ compiler prepares, as the above described inline information, a table of address intervals and inline information, or a table of addresses for relevant exception commands (an exception occurrence probable command, an exception handler head command and a method calling command) and the inline information. When an exception has occurred, an exception handler employs an address whereat the exception occurred and an address whereat the exception is caught to find a table corresponding to these addresses, and searches the table for desired inline information.

[Problems to be Solved by the Invention]

However, in order to obtain the inline information, the conventional Java™ compiling method requires two processes: a process for searching a table based on the address, and a process for searching for the inline information based on the obtained table. Therefore, the time required for these processes greatly affects the operating cost of the entire exception handling, and can not be ignored.

Further, according to the method used to obtain the inline information using the above table, there is a case wherein the locked state obtained from the inline information does not match the actual locked state. For example, for a case wherein a redundant lock is deleted by the optimization, even if the inline information indicates the inlined synchronized method, a lock due to the synchronized method is not always present.

It is, therefore, one object of the present invention to provide a compiling method and a method for performing an exception handling that will reduce the operating costs required for the acquisition of data concerning a lock needed for an exception handling, and to reduce the affect on the operating cost required for the exception handling. It is another object of the present invention to provide a method for the necessary release of a lock when an exception has occurred and for performing an exception handling.

SUMMARY OF THE INVENTION

To achieve the above objects, the present invention broadly provides a compiling method for converting, into machine language, source code for a target program prepared using a programming language, the aforesaid method comprising the steps of:
  (a) performing the inlining of a function in the aforesaid target program and generating information concerning the aforesaid inlining;
  (b) generating, based on the aforesaid information concerning the aforesaid inlining, lock data concerning a lock set for a resource using the aforesaid function; and
  (c) adding, based on the aforesaid lock data, a lock count set upon the execution of an exception handler in the aforesaid target program.

Preferably, the aforesaid adding step (c) comprises preparing a correlation table from which the aforesaid lock count set upon the execution of the aforesaid code is extracted by referring to an address for code wherein an exception has occurred, and further comprises adding the aforesaid correlation table as accessory information to the target program.

According to a preferred embodiment, the aforesaid adding step (c) encodes, into identification data for a try area that is established in the target program, a lock count set upon the execution of code in the try area.

Preferably, the method further comprises the steps of:
  (d) deleting an unnecessary lock from the target program, and for, in accordance with the lock deletion results, updating the lock data generated by generating step (b),
  wherein the aforesaid adding step (c), based on the lock data updated by the deleting step (d) adds a lock count to an exception handler.

The invention further provides a computer comprising:
  a compiler program, for compiling source code for a target program and converting the aforesaid source code into machine language code; and
  a processor, for executing the aforesaid machine language code for said target program,
  wherein the aforesaid compiler program includes:
    a lock data generator for, based on inlining data for a function in the target program, generating lock data for a resource by using the obtained inlined function, and
    a data addition unit for employing the aforesaid lock data to add, to the target program, data concerning a lock count upon the execution of code for the target program, and
    wherein, when an exception has occurred during the execution of the target program, based on the data concerning said lock count, said processor obtains a lock count upon the execution of code wherein the aforesaid exception occurred and a lock count upon the execution of an exception handler, and performs a process for the aforesaid exception after the locks of said resource are released in a number equivalent to the difference between those two lock counts.

Preferably, the aforesaid compiler program further comprises:
  a synchronization optimization unit for deleting an unnecessary lock from the target program, and for, in accordance with the obtained results, updating the lock data generated by the lock data generator, and
  wherein, based on the lock data updated by the synchronization optimization unit, the data addition unit adds data concerning the aforesaid lock count to the target program.

The invention also provides a program storage device readable by a computing machine, tangibly embodying a compiler program of instructions executable by the machine to perform method steps of a compiling method for converting, into machine language, source code for a target program prepared using a programming language, the aforesaid method comprising the steps of:
  (a) performing the inlining of a function in the aforesaid target program and generating information concerning the aforesaid inlining by an inlining unit of the aforesaid compiler program;
  (b) generating, based on the aforesaid information concerning the aforesaid inlining, lock data concerning a lock set for a resource using the aforesaid function by a lock data generator of the compiler program; and
  (c) adding, based on the lock data, a lock count set upon the execution of an exception handler in the target program by a data addition unit of the compiler program.

Preferably, the aforesaid data addition unit is operable to prepare a correlation table from which said lock count set upon the execution of the aforesaid code is extracted by referring to an address for code wherein an exception has occurred, and adds the aforesaid correlation table as accessory information to the target program.

Preferably, the data addition unit is operable to encode, into identification data for a try area that is established in the target program, a lock count set upon the execution of code in the try area.

According to a preferred embodiment, the program storage device further comprises:
  (d) a synchronization optimization unit for deleting an unnecessary lock from the target program, and for, in accordance with the lock deletion results, updating the lock data generated by generating step (b),
  wherein the data addition unit, based on said lock data updated by the synchronization optimization unit, adds a lock count to an exception handler.

When the exception handling method for executing the program is a stack unwinding method, the data addition unit prepares a correlation table from which the lock count set upon the execution of the code is extracted by referring to an address for code wherein an exception has occurred, and adds the correlation table as accessory information to the target program.

Thus, during the exception handling, the exception filter can employ the correlation table to directly obtain a lock count upon at the occurrence of an exception (upon the execution of code wherein an exception has occurred).

When the exception handling method for executing this program is a structured exception handling method, the data addition unit encodes, into identification data (ID) for a try area that is established in the target program, a lock count set upon the execution of code in the try area.

Therefore, during the exception handling, to immediately obtain a lock count upon the occurrence of an exception, the exception filter can employ the ID of the try area whereat the exception occurred.

The compiler further comprises: a synchronization optimization unit, for deleting an unnecessary lock from the program, and for, in accordance with the lock deletion results, updating the lock data generated by the lock data generator, wherein the data addition unit, based on the lock data updated by the synchronization optimization unit, adds a lock count to an exception handler.

The present invention can be implemented as a conversion program for controlling a computer for the conversion of an execution program. This conversion program permits a computer to perform: a function for employing information, concerning the inlining of a function for the execution program, to generate information concerning a use limit for a resource, for the function that is inlined; and a function for, based on the obtained information, adding to the execution program, upon the execution of code in the execution program, information concerning a use limit condition.

The conversion program permits the computer to further perform: a function for deleting an unnecessary use limit from the execution program, and for, in accordance with the obtained results, updating the information concerning the use limit condition upon the execution of the code, wherein, based on the updated information, information concerning the use limit condition is added to the program.

The conversion program can be implemented as a conversion program for converting an execution program prepared using an object-oriented programming language. This conversion program permits a computer to perform: a function for, based on information concerning the inlining of a method in an execution program, generating lock data concerning an object locked by the inlined method; and a function for, based on the lock data, adding a lock count, set upon the execution of code for the execution program, to the execution program.

The present invention can be implemented as an exception handling program (runtime library) for controlling a computer for the processing of exceptions occurring during the execution of a program. When an exception handling is performed using the stack unwinding method, the execution process program permits a computer, before the exception handling, to perform: a process, based on correlation data for addresses for code and a lock count for resources upon the execution of the code, that obtains a lock count upon the occurrence of an exception, and that corresponds to an address for code whereat an exception has occurred; a process for obtaining a lock count set upon the execution of an exception handler and that is added to the exception handler; and a process for releasing locks for the resource in a number equivalent to a difference between the lock count upon the occurrence of an exception and the lock count upon the execution of the exception handler.

When the structured exception handling method is employed to perform the exception handling, the exception handling program permits the computer to perform the following process before the exception handling. The program permits a computer to perform: a process for using identification data for a try area wherein a lock count for a resource is encoded upon the execution of code in the try area, for decoding the identification data for a try area that includes code wherein an exception has occurred and for obtaining a lock count for a resource upon the occurrence of the exception; a process for obtaining a lock count that is set upon the execution of an exception handler and that is added to the exception handler; and a process for releasing the locks of a resource in a number equivalent to a difference between the lock count upon the occurrence of the exception and the lock count upon the execution of the exception handler.

The conversion program and the exception handling program can be provided by being recorded on a storage medium, such as a magnetic disk, an optical disk or a semiconductor memory, or by being stored in the storage device of a program transmission apparatus and being distributed via a network.

According to the invention, a computer that executes the following exception handling program can be provided. The computer comprises: execution means, for executing a program; and exception handling means, for processing an exception when the exception has occurred while the program is being executed by the execution means, wherein, based on data concerning a lock count obtained for a resource upon the execution of code that is added to the program, the exception handling means obtains a lock count set upon the occurrence of an exception and a lock count set upon the execution of an exception handler, and performs a process for the exception after the locks of the resource are released in a number equivalent to the difference between these two lock counts.

According to the present invention, a computer having the following configuration can be provided. A computer comprises: a compiler, for compiling source code for a program and converting the source code into machine language code; and a processor, for executing the machine language code for the obtained program, wherein the compiler includes a lock data generator for, based on inlining data for a function in the program, generating lock data for a resource by using the obtained inlined function, and a data addition unit for employing the lock data to add, to the program, data concerning a lock count upon the execution of code for the program, and wherein, when an exception has occurred during the execution of the program, based on the data concerning the lock count, the processor obtains a lock count upon the execution of code wherein the exception occurred and a lock count upon the execution of an exception handler, and performs a process for the exception after the locks of the resource are released in a number equivalent to the difference between those two lock counts.

BRIEF DESCRIPTION OF THE DRAWINGS

FIG. 5A is an example compiled code structure for explaining information used when an exception handling is performed using the stack unwinding method.

FIG. 5B is a diagram showing a correlation table wherein a lock count is extracted by referring to a code address and is used to explain information used when an exception handling is performed using the stack unwinding method.

FIG. 6 is a diagram showing an example compiled code structure for explaining information used when an exception handling is performed using the structured exception handling method.

FIG. 7 is a diagram showing an example structure when a lock for method C is determined to be redundant and is deleted from the compile code in FIG. 6.

DESCRIPTION OF SYMBOLS USED IN THE DRAWINGS

Figure 1:
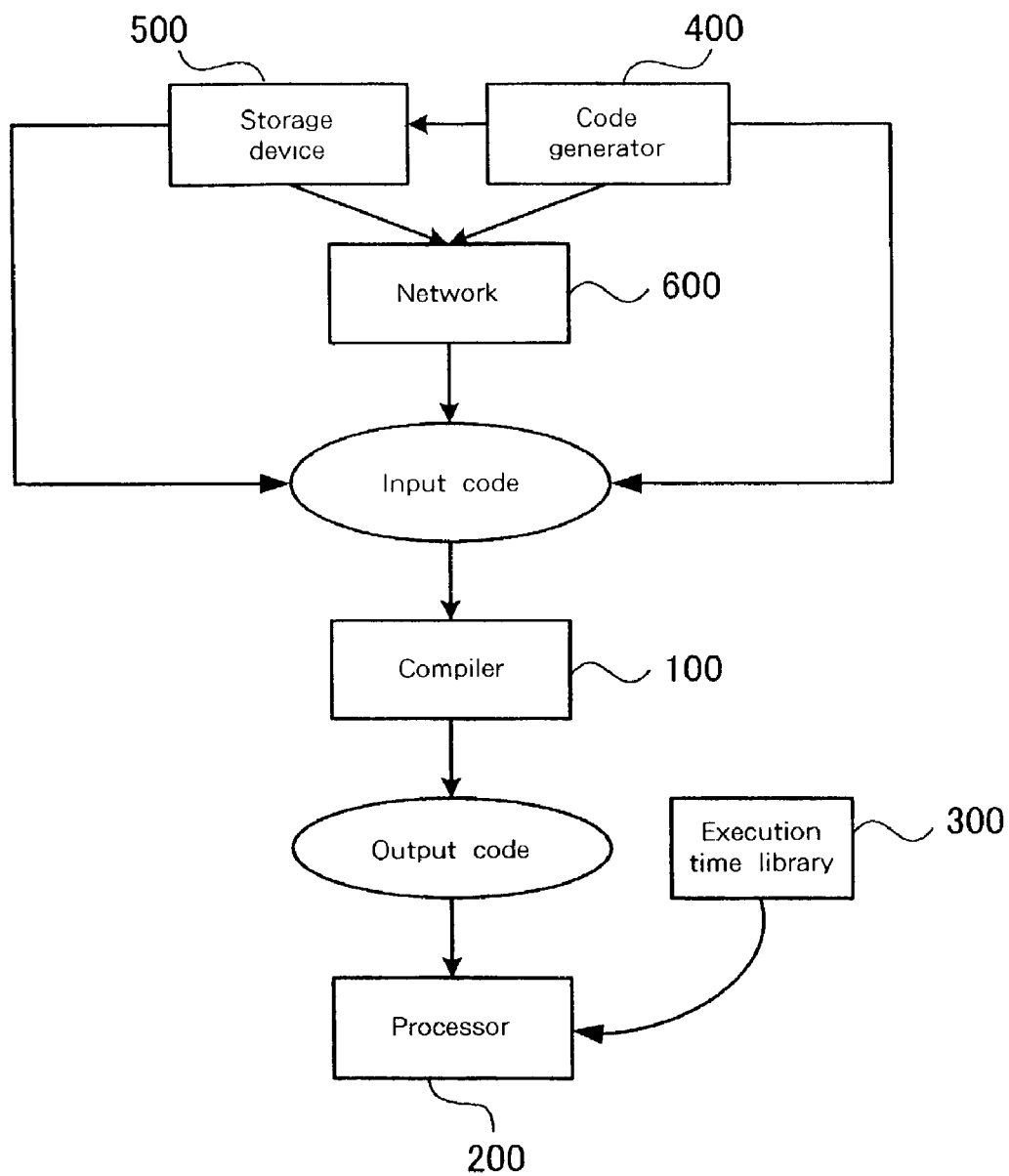
FIG. 1 is a diagram showing the system configuration of a computer that employs a compiler according to one embodiment of the present invention.

100: Compiler
110: Pre-processor
120: Lock data generator
130: Basic block correlation unit
140: Synchronization optimization unit
150: Post-processor
200: Processor
300: Execution time library
400: Code generator
500: Storage device
600: Network

DETAILED DESCRIPTION OF PREFERRED EMBODIMENT

The preferred embodiment of the present invention will now be described while referring to the accompanying drawings. This invention can in general be employed for a program written in a programming language configured for the execution of an exception handling based on miming and a try. In the following explanation, a Java™ program compiler is employed as a specific example.

Further, the present invention is implemented by embedding in a program, at the time the program is compiled, information that is set for the exception handling, and by performing, at the time the program is executed, the exception handling based on information embedded during compiling. Therefore, for the embodiment, the compiling process performed by a compiler and the execution process performed by a processor will be explained.

FIG. 1 is a diagram showing the system configuration of a

In FIG. 1, a compiler 100 receives and processes byte code, and generates and outputs code for a machine language. This byte code can be generated by a code generator 400 and input directly, or it can be retrieved from a storage device 500 wherein code generated by the code generator 400 is stored; alternately, it can be received from the code generator 400 or the storage device 500 via a network 600.

In this embodiment, the compiler 100 may be either a compiler, such as a JIT (Just In Time) compiler for the Java™ programming language, that dynamically compiles an execution program at the time of execution, or a compiler that complies a source program in advance and uses the obtained object program as an execution program.

The output code generated by the compiler 100 is executed by a processor 200, and an execution time library 300 is called as needed. The execution time library 300 is used to store a program, such as an exception filter, that performs an exception handling at the time of execution.

Figure 2:
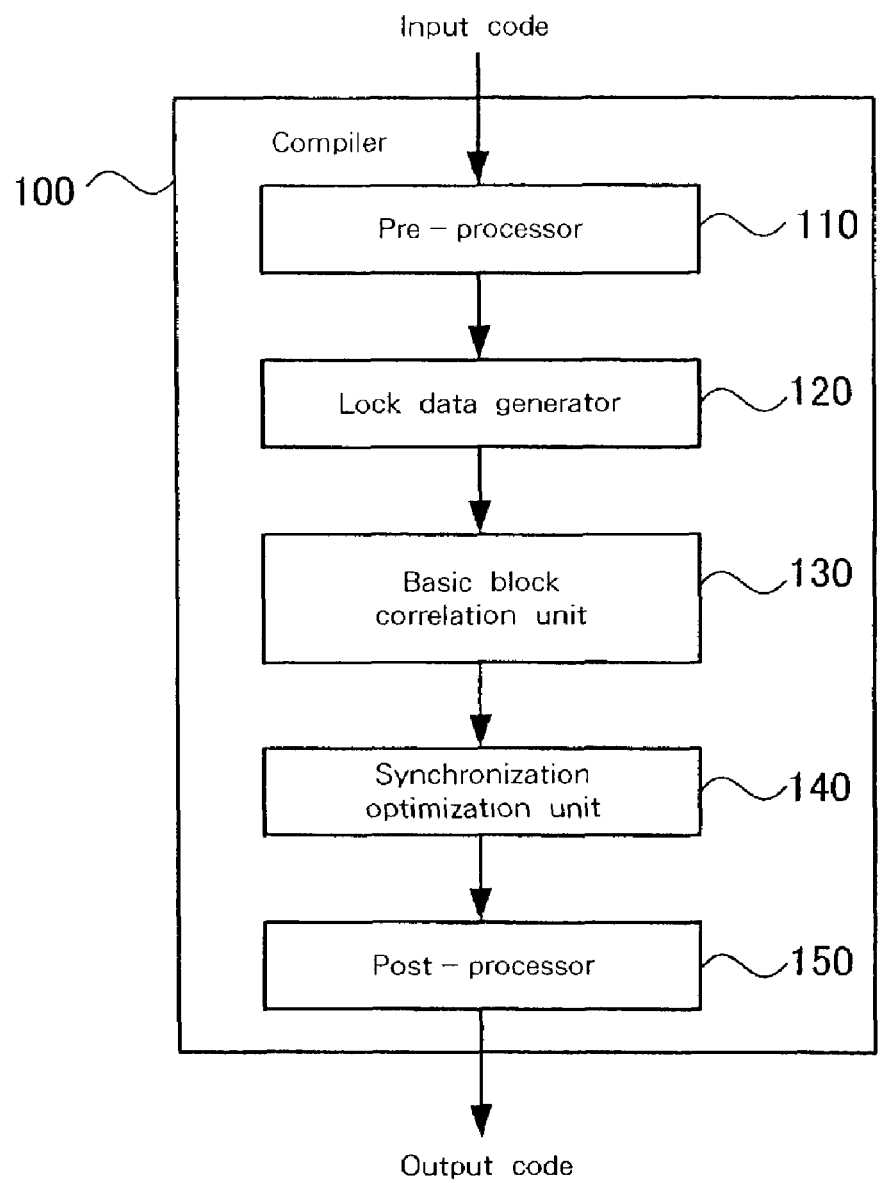
FIG. 2 is a diagram for explaining the configuration of the compiler according to the embodiment.

FIG. 2 is a diagram for explaining the configuration of the compiler 100 in this embodiment.

In FIG. 2, the compiler 100 comprises:
a pre-processor 110, which is an inlining unit for performing inlining for a method;
a lock data generator 120, for generating lock data;
a basic block correlation unit 130, for correlating lock data with a basic block;
a synchronization optimization unit 140, for deleting lock data for a superfluous lock; and
a post-processor 150, which is a data addition unit for storing required information for an exception handling.

The individual components of the compiler 100 in FIG. 2 are virtual software blocks implemented by a CPU that is controlled by a computer program. The computer program for controlling the CPU can be distributed by being stored on a storage medium, such as a CD-ROM or a floppy disk, or by being transmitted via a network.

The components of the compiler 100 in FIG. 2 represent the characteristic functions of the embodiment. And although not shown, in actuality, the compiler 100 also includes general functions required for the compiling process, such as those that perform either the lexical or syntax analysis of input code or the generation of machine language code.

The pre-processor 110 analyzes a program that is entered as input code, and performs optimization for the inlining of methods. The methods to be inlined include a synchronized method. The pre-processor 110 divides the basic block at the entrance and exit of the synchronized method that is inlined, and inserts code to obtain a lock (hereinafter referred to as locking code) and code for releasing a lock (hereinafter referred to as unlocking code). The basic block represents a range of a straight code, i.e., a code queue from which control flows neither enter nor exit.

The lock data generator 120 employs the inline data obtained through the inlining by the pre-processor 110 to collect the data concerning the locking code in accordance with the synchronized method that is inlined, and the number of locks (hereinafter referred to as a lock count). The obtained data are stored as lock data in the work memory.

The basic block correlation unit 130 correlates basic blocks with lock data by adding, to each basic block of the target program, a pointer corresponding to lock data.

The synchronization optimization unit 140 performs optimization, i.e., deletes unnecessary code in the locking code and unlocking code that are inserted into the target program by the pre-processor 110. Further, when data for a lock to be deleted is included in the lock data generated by the lock data generator 120, the synchronization optimization unit 140 deletes the pertinent data from the lock data, and decrements the lock count by one.

The post-processor 150 employs the lock data optimized by the synchronization optimization unit 140 to store, for each exception handler of the target program, the lock count set upon the execution of the exception handler.

Further, if the exception handling method is a stack unwinding method (there are two exception handling methods that will be described later), the post-processor 150 prepares a correlation table for extracting a lock count corresponding to the address of code wherein an exception has occurred and stores it in the memory. Even after the compiling has been completed, this correlation table continues to be stored as accessory information for the code.

On the other hand, if the exception handling method is a structured exception handling method, the lock count for a try area (hereinafter referred to as a lock count at the time of a try) is encoded and serves as the ID of the try area. Therefore, when a lock is obtained or released in the try area, the ID obtained by encoding the lock count is changed, even if the original ID of the try area is unchanged.

During the compiling of a program, the thus arranged compiler 100 embeds, in the program whereof the synchronized method is inlined, data concerning a lock due to the synchronized method.

By using as an example a program obtained in FIG. 8 using inlining, an explanation will be given for the processing performed when the compiler 100 embeds in a program data concerning the setting of a lock due to the synchronized method.

In the compiler 100, both lexical analysis and syntax analysis are performed for input code, and the pre-processor 110 performs, as the optimization process, inlining of the methods, including the synchronized method. The resultant state is shown in FIG. 8.

In this state, the program is processed by the lock data generator 120, and lock data is generated. Specifically, from the inline information "A→B→C", B→C and a lock count of 2 are obtained as information (the synchronized method whereby code is inserted) concerning the locking code. From the inline information "B→C", B and a lock count of 1 are obtained as information concerning the locking code.

Then, the basic block correlation unit 130 adds, to the basic block of the program, a pointer corresponding to lock data.

Following this, the synchronization optimization unit 140 deletes a superfluous lock, and processes the lock data in accordance with the results of the deletion. When, for example, the lock for the method C is deleted from the program in FIG. 8 as being redundant, the lock data corresponding to the method C is changed from information B→C, concerning the locking code and the lock count of 2, into information B, concerning the locking code and the lock count of 1.

Finally, the post-processor 150 stores the lock count in the program from which a superfluous lock has been deleted by the synchronization optimization unit 140.

An explanation will be given for the exception handling performed by the processor 200 when the program in which the lock data is embedded is executed and an exception occurs.

Figure 3:
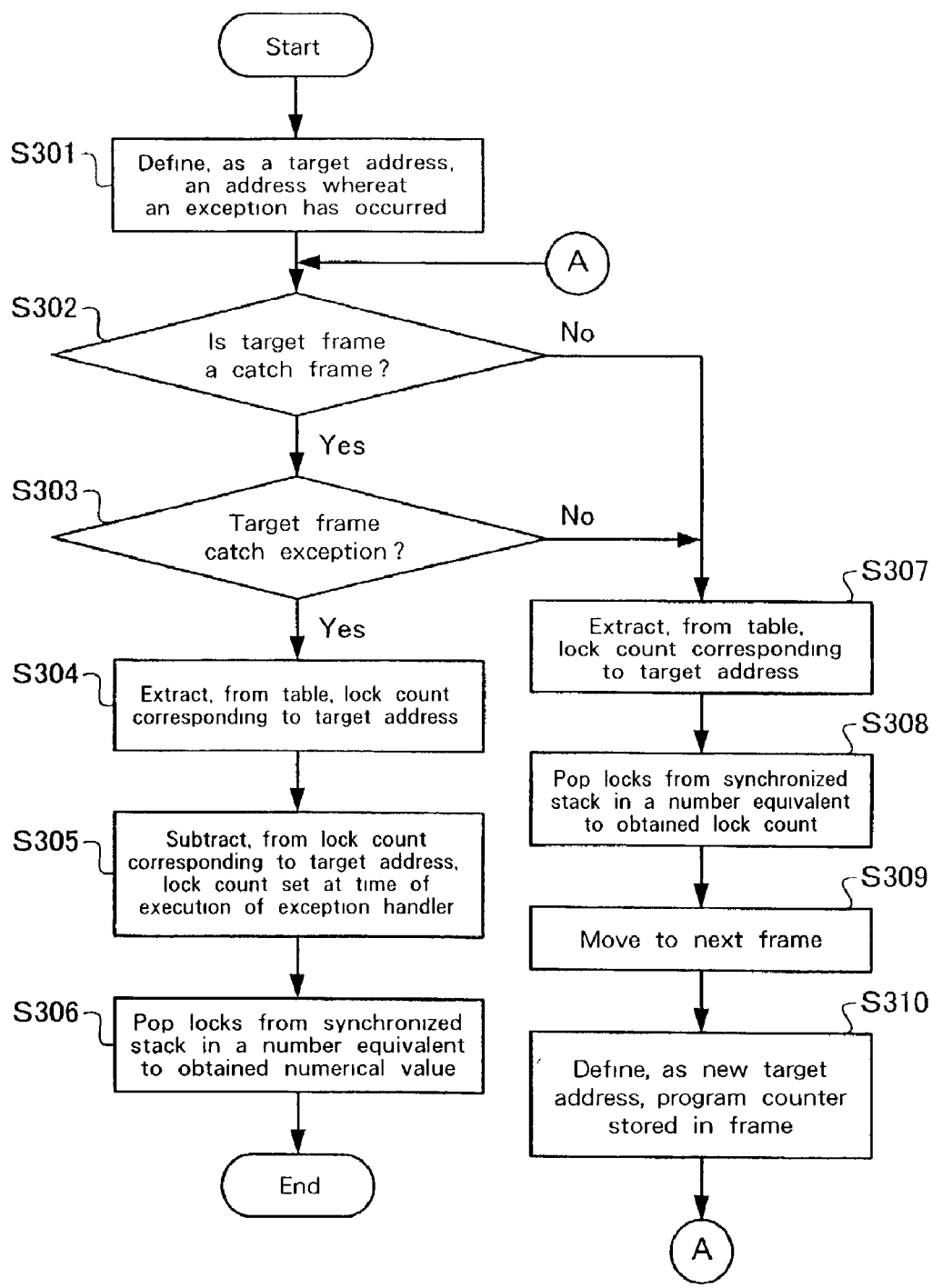
FIG. 3 is a flowchart for explaining the exception handling performed by a stack unwinding method for the embodiment.

For performing the exception handling, the available methods are the stack unwinding method and the structured exception handling method. FIG. 3 is a flowchart for explaining the exception handling performed using the stack unwinding method.

In FIG. 3, when an exception has occurred, first, the address of code that caused the exception is defined as a target address (step 301), and the stack frame whereat the exception occurred is defined as a target frame.

A check is then performed to determine whether the exception can be processed in the target frame, i.e., whether the target frame is a catch frame for the exception (step 302). When the target frame is a catch frame, a check is performed to determine whether the target frame has a handler that can process the exception, i.e., whether the target frame can catch the exception (step 303).

When the target frame can catch the exception, the lock count corresponding to the target address is extracted from the correlation table that is prepared during the compiling process (step 304).

Further, from the exception handler that catches the exception, the lock count is obtained that was set upon the execution of the exception handler and was added to the exception handler during the compiling process. Then, the lock count at the time of the execution of the exception handler is subtracted from the lock count (the lock count at the time of the occurrence of an exception) at step 304 (step 305).

To execute the program, a synchronized stack is generated for each frame by executing the locking code, and the synchronized stack is used to store an object to be locked in the LIFO (Last In First Out) buffer.

Locks in a number equivalent to the lock count obtained at step 305 are then popped (released) from the synchronized stack (step 306).

When at step 302 the target frame is not a catch frame, or when at step 303 the target frame can not catch the exception, the lock count corresponding to the target address is extracted from the correlation table (step 307). Then, locks in a number equivalent to the obtained lock count are popped (released) from the synchronized stack (step 308).

Then, a frame that precedes the target frame near the calling side is defined as a new target frame (step 309), and a resumption address in the new target frame is defined as a new target address. Following this, the process beginning at step 302 is performed again (step 310).

Through this processing, when in this embodiment an exception has occurred during the execution of a program, locks can be appropriately released in accordance with data concerning the locks embedded in the program and a correlation table for the address of the code whereat an exception may occur and the lock count.

In this embodiment, the data concerning the locks embedded in the program reflect the synchronization optimization results obtained by the deletion of a superfluous unnecessary lock, and the state of the lock obtained from this data always matches the actual lock state.

In addition, a lock count acquired upon the occurrence of an exception can be obtained directly from the correlation table, and a lock count set upon the execution of the exception handler can be used as added data for the exception handler. Further, a lock to be released is mechanically determined by the synchronized stack that is prepared at the time of execution of the program. Therefore, operating costs can be reduced compared with the conventional case wherein two searches are required to obtain the inline information.

Figure 4:
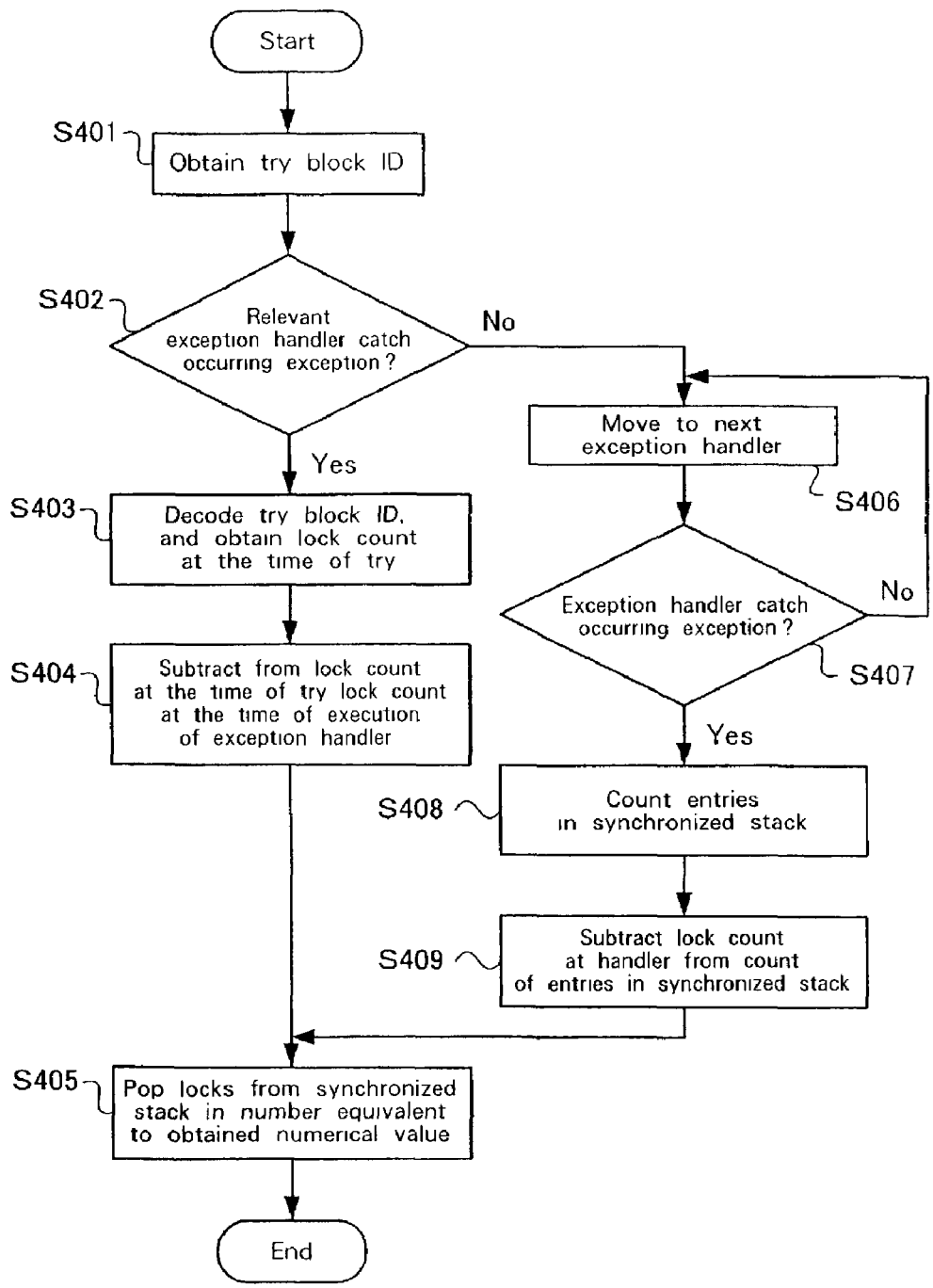
FIG. 4 is a flowchart for explaining the exception handling performed by a structured exception handling method for the embodiment.

An explanation will now be given for a case wherein the structured exception handling method is used as the exception handling method. FIG. 4 is a flowchart for explaining the exception handling performed using the structured exception handling method.

As is shown in FIG. 4, when an exception has occurred, first, the ID of a target try area is obtained (step 401), and then a check is performed to determine whether an exception handler relevant to the try area can catch the exception that has occurred (step 402).

When the exception handler can catch the exception, the ID obtained at step 401 is decoded, and the lock count at the time of the try, which is encoded into the ID during the compiling process, is obtained (step 403). When, as is described above, a lock is set or released in the try area, the lock count that is encoded into the original ID is changed, so that following the encoding the ID value is changed, even for the same try area, and the change in the lock count is reflected. Thus, when the ID of the try area is decoded upon the occurrence of an exception, the try area can immediately be identified, and the lock count at the time the exception occurs can be obtained.

Following this, from the exception handler that catches the exception, the lock count is obtained that was set upon the execution of the exception handler and that was added to the exception handler. Then, the lock count obtained at the time of the execution of the exception handler is subtracted from the lock count (the lock count at the time of the try) obtained at step 403 (step 404).

Thereafter, locks in a number equivalent to the lock count obtained at step 404 are popped (released) from the synchronized stack (step 405).

When the exception handler relevant to the target try area can not catch the exception, a try area that includes the pertinent try area is focused on (step 406). A check is performed to determine whether the exception handler that is relevant to the new target try area can catch the exception (step 407).

These processes at steps 406 and 407 are repeated until an exception handler that can catch the exception is found.

When an exception handler is found that can catch the exception, the entries in the synchronized stack are counted (step 408), and the lock count that was set at the time of the execution of the exception handler, and that was added to the exception handler that can catch the exception, is subtracted from the entry count that is obtained (step 409).

Thereafter, locks in a number equivalent to the count obtained at step 409 are popped (released) from the synchronized stack (step 405).

Through this processing, when in this embodiment an exception has occurred during the execution of a program, locks can be appropriately released based on the data concerning the locks embedded in the program, i.e., the lock count that is set upon the execution of the exception handler and that is added to each exception handler, and the lock count, at the time of the try, that is encoded into the ID of the try area.

In this embodiment, the data concerning the locks embedded in the program reflect the synchronization optimization results obtained by the deletion of a superfluous lock, and the state of the lock obtained from this data always matches the actual lock state.

Further, the lock count upon the occurrence of the exception can be obtained directly by decoding the ID in the try area, and the lock count at the execution of the exception handler can be obtained as data that is added to the exception handler. Further, a lock to be released can be mechanically determined by the synchronized stack that is prepared during the execution of the program. Therefore, the operating costs can be reduced when compared with the conventional case wherein two searches are required to obtain the inline information.

The information to be embedded in the program and the process performed upon at the occurrence of an exception will be described by using a separate example for the stack unwinding method and the structured exception handling method that are employed as the exception handling method.

Figure 8:
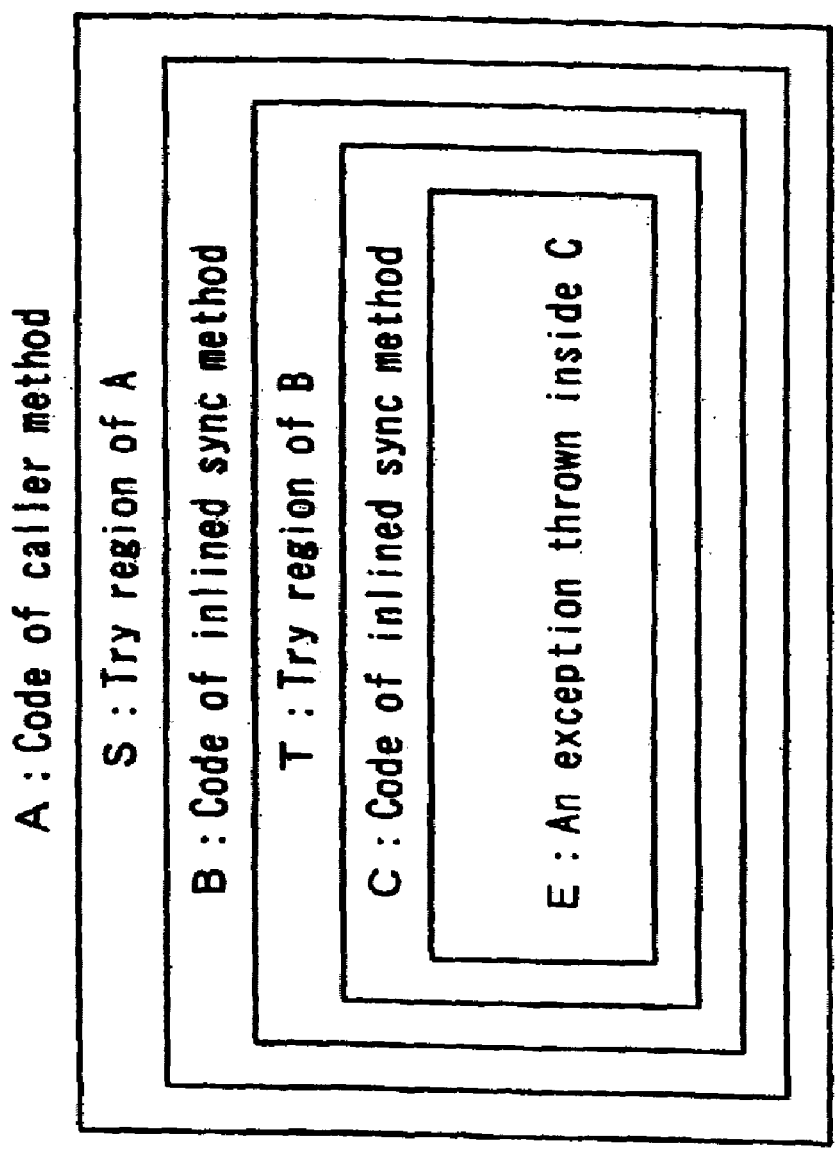
FIG. 8 is a diagram for explaining the concept of Java™ program code wherein a synchronized method is inlined.

FIG. 5A is a diagram showing the structure of compiled code corresponding to FIG. 8. The blocks represent methods, and characters represent method names. "S of A" represents a try area for method A, and "T of B" represents a try area for method B. The code areas for method C are arranged at two places (address a2 to a3-1 and address a5 to a6-1) by the rearrangement of the basic blocks, and fall into the scope of try area T.

A value of 0 is allocated for the ID of a try area (indicated as try ID in FIG. 5A; hereinafter it is referred to as a try ID) in the code areas for methods B and C. The lock data (sync Info in FIG. 5A) is represented as [lock count] synchronized method 1, synchronized method 2, . . .

FIG. 5B is a diagram showing a correlation table from which a lock count corresponding to the code address is extracted. In FIG. 5B, it is found that, for example, the lock count is 1 (#lock in FIG. 5B) in the range extending from code address a1 to a2-1 in FIG. 5A.

Assume that the compiled code is executed and an exception has occurred at ax between the addresses a5 and a6. The exception filter that has caught the exception employs the correlation table in FIG. 5B, and examines the address ax to obtain a lock count of 2.

Furthermore, the exception filter finds an exception handler relevant to the try area T, and obtains a lock count of 1 upon the execution of the exception handler. The locks are released from the synchronized stack in a number equivalent to the difference, between the lock counts, of 1.

An explanation will now be given for a case wherein the structured exception handling method is employed for the exception handling.

FIG. 6 is a diagram showing an example structure for the compiled code in FIG. 8, which is the same as the example in FIG. 5A. The ID (try ID) in the try area and the lock data (sync Info) are also the same as those in FIG. 5A. It should be noted, however, that since in FIG. 6 the code area for the method C is not located at two separate positions, the method C (X exception) located at the bottom in FIG. 5A is included in method C located in the try area T (T of B).

Further, in FIG. 6, the ID (enc try ID in FIG. 6) obtained by encoding the lock count at the time of the try is defined as try ID+lock count*the total number of tries. For example, since try ID in method B is 1, the lock count is 1 and the total number of tries is 2, the ID following encoding is 3 (=1+1*2).

Further, as well as the normal try ID that is not encoded, the encoded ID is updated at the portion of the control flow whereat the ID of the try area is changed. In this embodiment, since the lock count is increased by performing the inlining of the synchronized method in the try area, the frequencies for updating the encoded ID are increased more than are those for updating the non-encoded ID (try ID). However, this is not actually a problem since the ID updating cost is smaller than the synchronization cost, and since the redundant lock is deleted and is not encoded.

Assume that the compile code is executed and that an exception has occurred in method C in the try area T (T of B). The exception filter decodes the ID) in the try area upon the occurrence of the exception, and as is described above, since the lock count is encoded with the try ID using the following calculation, try ID (=0)+lock count (=2)* the total number of tries (=2) where the values in parentheses are those in method C, the value obtained by dividing the encoded ID value by 2 (the total number of tries) is the lock count and the remainder is the try ID value. In this case, the lock count is 2 (=4/2), and the try ID is 0.

In addition, the exception filter finds an exception handler relevant to the try area T, and obtains a lock count of 1 for the exception handler.

The locks are then released from the synchronized stack in a number equivalent to a difference, between the lock counts, of 1.

FIG. 7 is a diagram showing an example structure when the lock for method C is determined to be redundant and is deleted from the compiled code in FIG. 6.

When FIGS. 6 and 7 are compared, the lock data (sync Info) corresponding to method C are changed from [2]B, C to [1]B, and the value of the encoded ID is changed from 4 (=0+2*2) to 2 (=0+1*2).

As is described above, according to the embodiment, even when a superfluous lock is deleted during the compiling process, the synchronization optimization unit 140 generates information in which the deletion of the lock is reflected, and is embedded in the compiled code.

As will be understood from the foregoing description of the invention, data concerning a lock required for the exception handling can be directly obtained from the program code. Thus, the operating costs for obtaining this data can be reduced, and further, the affect of the exception handling on the operating costs can also be reduced.

According to the invention, since information that reflects the optimization results obtained by the deletion of a superfluous lock is embedded in the program code, the lock can be appropriately released upon the occurrence of an exception, and the exception handling can be performed.

Although illustrative embodiments of the invention have been described herein, it will be apparent to those skilled in the computer science field that changes and modifications can be made without departing from the scope and spirit of the present invention as set forth in the appended claims.

What is claimed is:

1. A compiling method for converting, into machine language, source code for a target program prepared using a programming language, said method comprising:
    performing an inlining of a function in said target program and generating information concerning said inlining;
    generating, based on said information concerning said inlining, lock data concerning a lock set for a resource using said function; and
    adding, based on said lock data, a lock count set upon execution of an exception handler in said target program.

2. A method according to claim 1, further comprising:
    preparing a correlation table from which a lock count set upon the execution of said code is extracted by referring to an address for code wherein an exception has occurred, and
    adding said correlation table as accessory information to said target program.

3. A method according to claim 1, further comprising:
    encoding a lock count into identification data for a try area that is established in said target program, said lock count bring set upon the execution of code in said try area.

4. A method according to claim 1, further comprising:
    deleting an unnecessary lock from said target program, and in accordance with the lock deletion results, updating said generated lock data; and
    adding, based on said updated lock data, a lock count to an exception handler.

5. A method according to claim 1, further comprising:
    preparing a correlation table from which said lock count set upon the execution of said code is extracted by referring to an address for code wherein an exception has occurred.

6. A method according to claim 5, further comprising:
    adding said correlation table as accessory information to said target program.

7. A method according to claim 1, further comprising:
    deleting an unnecessary lock from said target program, and for, in accordance with the lock deletion results, updating said generated lock data.

8. A method according to claim 7, further comprising:
    adding, based on said updated lock data, a lock count to an exception handler.

9. A computer comprising:
    a compiler program, for compiling source code for a target program and converting said source code into machine language code; and
    a processor, for executing said machine language code for said target program,
    wherein said compiler program comprises:
        a lock data generator for generating lock data for a resource based on inlining data for a function in said target program, and
        a data addition unit for employing said lock data to add, to said target program, data concerning a lock count upon the execution of code for said target program, and
    wherein, when an exception has occurred during the execution of said target program, based on said data concerning said lock count, said processor
        obtains a lock count upon the execution of code wherein said exception occurred and a lock count upon the execution of an exception handler, and
    performs a process for said exception after the locks of said resource are released in a number equivalent to the difference between those two lock counts.

10. A computer according to claim 9, wherein said compiler program further comprises:
    a synchronization optimization unit for deleting an unnecessary lock from said target program, and, in accordance with the obtained results, updating said lock data generated by said lock data generator,
    wherein, based on said lock data updated by said synchronization optimization unit, said data addition unit adds data concerning said lock count to said target program.

11. A computer according to claim 9, wherein said compiler program further comprises:
    a synchronization optimization unit for deleting an unnecessary lock from said target program, and for, in accordance with the obtained results, updating said lock data generated by said lock data generator.

12. A computer according to claim 11, wherein, based on said lock data updated by said synchronization optimization unit, said data addition unit adds data concerning said lock count to said target program.

13. A program storage device readable by a computing machine, tangibly embodying a compiler program of instructions executable by the machine to perform a compiling method for converting, into machine language, source code for a target program prepared using a programming language, said method comprising:
    performing an inlining of a function in said target program and generating information concerning said inlining by an inlining unit of said compiler program;
    generating, based on said information concerning said inlining, lock data concerning a lock set for a resource using said function by a lock data generator of said compiler program; and
    adding, based on said lock data, a lock count set upon execution of an exception handler in said target program by a data addition unit of said compiler program.

14. A program storage device according to claim 13, wherein said data addition unit is operable to prepare a correlation table from which said lock count set upon the execution of said code is extracted by referring to an address for code wherein an exception has occurred, and adds said correlation table as accessory information to said target program.

15. A program storage device according to claim 13, wherein said data addition unit is operable to encode, into identification data for a try area that is established in said target program, a lock count set upon the execution of code in said try area.

16. A program storage device according to claim 13, further comprising:
    a synchronization optimization unit for deleting an unnecessary lock from said target program, and for, in accordance with the lock deletion results, updating said lock data generated by said lock data generator,
    wherein said data addition unit, based on said lock data updated by said synchronization optimization unit, adds a lock count to an exception handler.

17. A program storage device according to claim 13, wherein said data addition unit is operable to prepare a correlation table from which said lock count set upon the execution of said code is extracted by referring to an address for code wherein an exception has occurred.

18. A program storage device according to claim 17, wherein, and adds said correlation table as accessory information to said target program.

* * * * *